(12) United States Patent
Faucheux et al.

(10) Patent No.: US 9,843,058 B2
(45) Date of Patent: Dec. 12, 2017

(54) FUEL-CELL STACK COMPRISING AN ANODE CHAMBER COMPRISING IN THE ANODE CHAMBER AN AREA FOR CONDENSING AND REMOVING WATER AND METHOD FOR CONDENSING AND REMOVING WATER FORMED IN SAID CHAMBER

(75) Inventors: Vincent Faucheux, Lans en Vercors (FR); Antoine Latour, Grenoble (FR); Jessica Thery, Fontaine (FR); Bruno Valon, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 412 days.

(21) Appl. No.: 14/000,787

(22) PCT Filed: Feb. 28, 2012

(86) PCT No.: PCT/FR2012/000072
§ 371 (c)(1),
(2), (4) Date: Aug. 21, 2013

(87) PCT Pub. No.: WO2012/117172
PCT Pub. Date: Sep. 7, 2012

(65) Prior Publication Data
US 2013/0330643 A1    Dec. 12, 2013

(30) Foreign Application Priority Data
Mar. 2, 2011    (FR) .................... 11 00628

(51) Int. Cl.
*H01M 8/04291* (2016.01)
*H01M 8/04119* (2016.01)
*H01M 8/1018* (2016.01)

(52) U.S. Cl.
CPC ... *H01M 8/04291* (2013.01); *H01M 8/04164* (2013.01); *H01M 8/04171* (2013.01); *H01M 2008/1095* (2013.01)

(58) Field of Classification Search
CPC ......... H01M 8/04291; H01M 8/04164; H01M 8/04171; H01M 2008/1095
See application file for complete search history.

(56) References Cited

U.S. PATENT DOCUMENTS

2002/0146610 A1* 10/2002 Hayashi ................. H01M 8/02
429/429
2003/0068543 A1    4/2003 Yasuo et al.
(Continued)

FOREIGN PATENT DOCUMENTS

| JP | 2007-522629 A | 8/2007 |
| JP | 2009-259779 A | 11/2009 |
| JP | 2009-289540 A | 12/2009 |

OTHER PUBLICATIONS

Nov. 4, 2015 Office Action issued in Japanese Application No. 2013-555917.

*Primary Examiner* — Eugenia Wang
(74) *Attorney, Agent, or Firm* — Oliff PLC

(57) ABSTRACT

The fuel cell includes an anode chamber having a hydrogen inlet emerging into it. A wall separating the inside of the anode chamber from the outside thereof includes a main region having a first thermal conduction resistance between the outside and the inside of the anode chamber, and a region for promoting the condensation of water having a second thermal conduction resistance between the outside and the inside of the anode chamber strictly smaller than the first thermal conduction resistance so as to delimit a water condensation surface within the anode chamber. A channel (Continued)

for removing the condensed water connects the condensation area to the outside of the anode chamber.

22 Claims, 2 Drawing Sheets

(56) References Cited

U.S. PATENT DOCUMENTS

| | | | |
|---|---|---|---|
| 2003/0196381 A1* | 10/2003 | Eberspach | B01B 1/005 48/197 FM |
| 2006/0024544 A1* | 2/2006 | Nielsen | H01M 8/04007 429/410 |
| 2006/0029858 A1* | 2/2006 | Ji | H01M 8/0234 429/450 |
| 2006/0121326 A1 | 6/2006 | Hiramatsu et al. | |
| 2008/0038605 A1* | 2/2008 | Matsuda | H01M 8/04156 429/414 |
| 2008/0057367 A1 | 3/2008 | Nakakubo | |
| 2008/0131745 A1* | 6/2008 | Ikeda | H01M 8/04164 429/413 |
| 2009/0092865 A1 | 4/2009 | Sekino et al. | |
| 2009/0197128 A1 | 8/2009 | Bencherif et al. | |
| 2009/0246580 A1 | 10/2009 | Imura et al. | |
| 2009/0246593 A1* | 10/2009 | Nowatari | H01M 4/881 429/465 |
| 2009/0263688 A1* | 10/2009 | Yajima | H01M 8/1009 429/413 |

* cited by examiner

FUEL-CELL STACK COMPRISING AN ANODE CHAMBER COMPRISING IN THE ANODE CHAMBER AN AREA FOR CONDENSING AND REMOVING WATER AND METHOD FOR CONDENSING AND REMOVING WATER FORMED IN SAID CHAMBER

BACKGROUND OF THE INVENTION

The invention relates to a fuel cell comprising an anode chamber having a hydrogen inlet emerging into it.

STATE OF THE ART

In anode chamber-type fuel cells capable of housing one or several anodes, the electricity generation occurs due to the oxidation, on an anode, of a hydrogen-type fuel, and to the reduction, on a cathode, of an oxidizer of air oxygen type. Generally, the anode and the cathode are separated by an electrolyte membrane often made of Nafion®. In the specific example of hydrogen as fuel, the latter dissociates at the anode ($H_2 \rightarrow 2H^+ + 2e^-$) to provide $H^+$ ions which cross the membrane and react at the cathode, which is where the oxidizer flows, to generate water ($\frac{1}{2}O_2 + 2H^+ + 2e^- \rightarrow H_2O$). However, part of the water generated on the cathode side diffuses back through the membrane and ends up in the form of vapor in the anode chamber. According to the outside conditions (temperature, humidity) and to the operating conditions (efficiency, system confinement), such a back diffusion may concern from 10% to 40% of the water generated at the cathode.

Further, if hydrogen is generated upstream of the anode by hydrolysis of a chemical hydride, this imposes for a certain load of water to be present in the gas, resulting from the hydrolysis, which has been brought to the anode level.

Thus, during the fuel cell operation, the anode chamber fills with water vapor which condenses little by little, causing a decrease in the fuel cell efficiency since the condensed water hinders the passing of hydrogen towards catalytic sites of the anode.

Document US2006/0121326 describes a fuel cell provided, at an anode, with a hydrogen inlet channel and with a channel for letting out the hydrogen which has not reacted and impurities. The drain-off channel is configured to purge impurities, it comprises a valve which opens for a determined time period.

The purge system of document US2006/0121326 cannot be applied to fuel cells of the type having an anode chamber. Indeed, in such cells, water condenses in the anode chamber and becomes stagnant. Since the fuel cell may operate in any position, it is difficult to place a purge valve without causing a significant loss of the fuel cell efficiency on removal of the stagnant water, since a significant hydrogen volume would then also be exhausted outside of the anode chamber.

SUMMARY OF THE INVENTION

The object of the invention is to form a fuel cell capable of performing an efficient purge of water contained in the anode chamber, whatever the position of the fuel cell. This object tends to be achieved by the accompanying claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERRED EMBODIMENTS

The fuel cell described hereafter enables to remove the water condensed in the anode chamber, especially by back diffusion of the water generated at the fuel cell cathode, during its operation due to an area promoting both the condensation of water and the removal of the condensed water.

Figure 1:
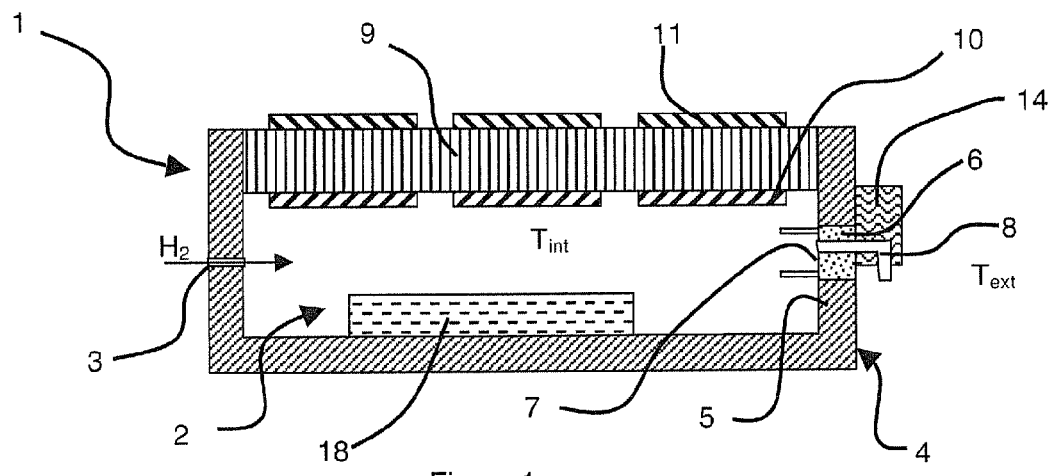
FIG. 1 shows a cross-section view of a first embodiment of a fuel cell.
Figure 2:
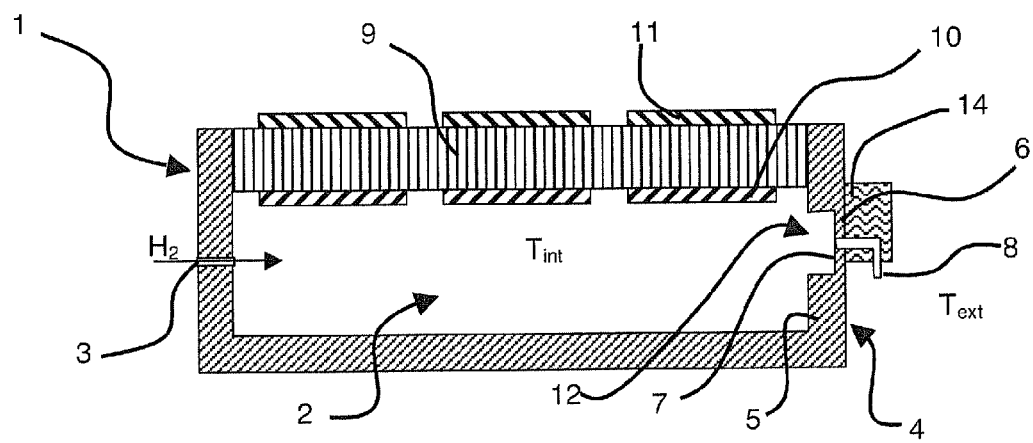
FIG. 2 shows a cross-section view of a second embodiment of a fuel cell.
Figure 3:
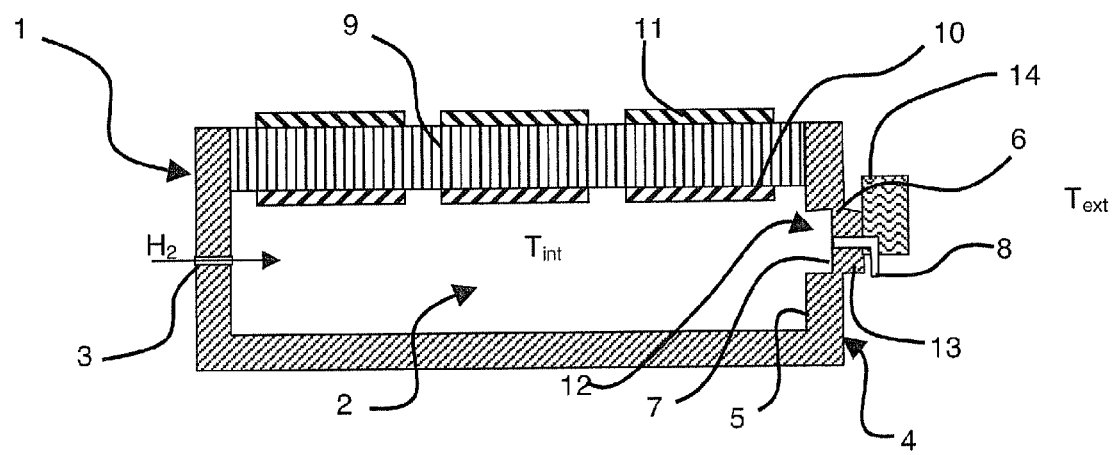
FIG. 3 shows a cross-section view of a variation of the second embodiment of a fuel cell.

In FIGS. 1 to 3, fuel cell 1 comprises an anode chamber 2 having a hydrogen inlet 3 emerging into it. A wall 4 separates the inside of anode chamber 2 from the outside thereof. Wall 4 comprises a main region 5 having a first thermal conduction resistance between the outside and the inside of the anode chamber 2. Wall 4 further comprises a special region 6 for promoting the condensation of water having a second thermal conduction resistance between the outside and the inside of anode chamber 2 strictly smaller than the first thermal conduction resistance, so as to delimit a water condensation area 7 within anode chamber 2.

A channel 8 for draining off the condensed water connects condensation surface 7 to the outside of anode chamber 2. Preferably, drain-off channel 8 crosses water condensation region 6. Drain-off channel 8 may have an open state where water can be removed and a closed state where the inside of anode chamber 2 is tight with respect to the outside of anode chamber 2 at the level of said drain-off channel 8. Drain-off channel 8 may be a capillary. The capillary forms a tube enabling to displace water in said tube by over-pressure from the inside of anode chamber 2 to the outside of anode chamber 2.

This specific configuration enables to promote the condensation of the water present in vapor form in anode chamber 2 on condensation surface 7. This is made possible by the present fuel cell by exploiting the temperature difference on wall 4 between the inside and the outside of anode chamber 2 so that at least one point of the internal surface of anode chamber 2 (here, the condensation area 7) is at a strictly lower temperature than the rest of main region 5.

Actually, the thermal conduction resistance enables to define an element according to its resistance to the passage of a thermal conduction flow between two surfaces. Thus, the higher the thermal resistance, the lower the amount of heat crossing the element. By definition, a thermally insulating material will be said to have a high thermal conduction resistance. Thus, the specific features of main region 5 and of condensation region 6 defined hereabove enable to promote the condensation at a specific point of a fuel cell, preferably when inner temperature $T_{int}$ of anode chamber 2 is strictly greater than outer temperature $T_{ext}$ of anode chamber 2.

In the specific example of FIGS. 1 to 3, anode chamber 2 may comprise several walls delimiting, with an electrolyte membrane 9 and/or at least one anode 10, the inside of anode chamber 2. A wall comprises a first surface delimiting at least a part of the inside of anode chamber 2 and a second surface delimiting at least a portion of the outside of anode chamber 2. Membrane 9, for example, made of Nafion®, is in contact with anode 10 arranged inside of anode chamber 2. A cathode 11 associated with the anode is arranged against membrane 9 outside of anode chamber 2. According to the illustrated example, fuel cell 1 comprises several elementary cells (three in the present example) delimited by pairs of electrodes (anode/cathode), each pair being separated by an electrolyte membrane 9. An electrolyte membrane 9 may be specific to each elementary cell. In this case, the fuel cell comprises several individual membranes, each corresponding to an elementary cell. According to a variation, a same electrolyte membrane 9 is common to at least two elementary cells. The anodes are all arranged in anode chamber 2 so that hydrogen can diffuse on catalytic sites of the anodes to promote reaction $H_2 \rightarrow 2H^+ + 2e^-$. When the fuel cell comprises several walls, these walls each comprise at least one main region. At least one of the walls comprises at least one condensation region 6 having the above-mentioned properties. Preferably, the membrane has a thermal conduction resistance greater than that of the condensation region (s) to avoid water condensation at the anodes in the anode chamber 2. Preferably, the thermal conduction resistance of a condensation region 6 between the inside and the outside of the chamber is strictly smaller than the thermal conduction resistance between the inside and the outside of the chamber of all the main regions. Of course, a wall may comprise several condensation regions and their associated drain-off channels. Further, the different walls may each comprise one or several condensation regions and their associated drain-off channels.

FIG. 1 illustrates a first embodiment where condensation region 6 is formed by an insert filling a hole of wall 4 having the inside of anode chamber 2 communicate with the outside of anode chamber 2.

Preferably, the insert is made of a material having a higher thermal conductivity than the material(s) used to delimit main region 5. For example, main region 5 may be made of a thermally-insulating plastic material, and the insert may be made of a metal, for example, aluminum, stainless steel, copper, nickel, etc. Although the insert preferably has a cylindrical or conical shape, any shape capable of being inserted in a corresponding hole of wall 4 is appropriate. The insert also preferably ensures the tightness of anode chamber 2 to avoid hydrogen losses from the inside of anode chamber 2 to the outside of anode chamber 2 at the level of said insert when drain-off channel 8 is closed. The insert may be glued or force-fitted. The insert is preferably covered with a protective layer avoiding its corrosion inside and outside of chamber 2. The surface of the insert forming condensation area 7 inside of anode chamber 2 preferably ranges between 0.05 mm² and 1 cm². Such surface areas substantially correspond to the size of a water drop capable of forming by condensation in an anode chamber of a 10-W fuel cell.

The insert may also be formed by drain-off channel 8 only, when the latter is a capillary, and in this case, condensation surface 7 is equal to the cross-section of the capillary.

In FIG. 2 illustrating a second embodiment, condensation region 6 is formed by a local thinning 12 of wall 4 in anode chamber 2. The local thinning of wall 4 may be in the form of a recess made in wall 4 inside of anode chamber 2. In other words, main region 5 has a thickness strictly greater than the thickness of condensation region 6. Thus, even if the main region 5 and the condensation region 6 are made of a same material, the thermal conduction resistances between the inside of anode chamber 2 and the outside of anode chamber 2 will be different. In this embodiment, drain-off channel 8 preferably connects the bottom of thinning 12 to the outside of anode chamber 2. The bottom of thinning 12 then forms condensation area 7.

FIG. 3 illustrates a variation of the second embodiment. In this variation, condensation region 6 is formed both by a local thinning 12 and by a protrusion 13 outside of anode chamber 2 at the level of local thinning 12. In this variation, protrusion 13 plays a role by promoting thermal exchanges between the outside of anode chamber 2 and condensation area 7, by increasing the thermal exchange surface area on the outside of anode chamber 2.

The second embodiment and its variation have an advantage over the first embodiment in terms of manufacturing. Indeed, the tightness of anode chamber 2 will be easier to achieve with a local thinning of wall 4 in anode chamber 2 than with the placing of an insert in a hole in wall 4, as in FIG. 1.

In the different embodiments considered hereabove, the closed or open state of drain-off channel 8 may be obtained by means of a valve 14 (FIGS. 1 to 3). In other words, drain-off channel 8 is connected to a valve 14 controlling the removal of the water condensed on condensation area 7 through said drain-off channel 8.

According to a implementation, for a 10-W cell providing approximately 1 g of water per hour, valve 14 may be open for 1 ms every 10 s. However, such a sequential implementation generates a hydrogen loss in the case where there would be no condensed water at the level of condensation area 7. Hydrogen losses thus need to be limited during the operation of fuel cell 1.

Figure 4:
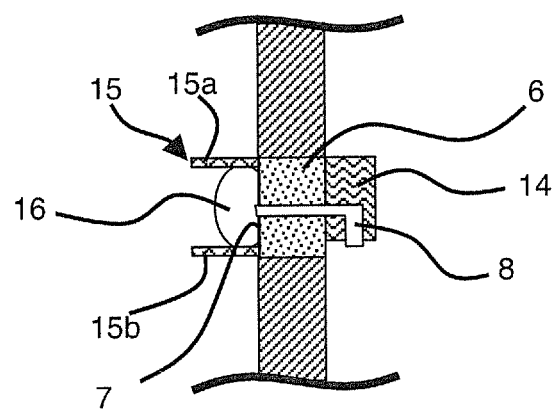
FIG. 4 illustrates a cross-section view centered on a condensation region equipped with a sensor of the presence of water.

In FIG. 4, to answer this need, condensation area 7 of region 6 is fitted with a sensor 15 of the presence of water on said condensation area 7. Presence sensor 15 is connected to valve 14 so as to start a draining when water 16 is present on condensation area 7. For example, presence sensor 15 is connected to a control element (not shown), itself connected to valve 14. Presence sensor 15 may comprise two electrically-conductive terminals 15*a*, 15*b* electrically insulated from each other, and arranged at the level of condensation area 7 so as to be placed in electric contact in the case where water is present on condensation area 7. Preferably, channel 8 comprises an opening arranged between terminals 15*a*, 15*b* of presence sensor 15. By measuring the electric conductivity at terminals 15*a*, 15*b*, it is possible to detect the presence or the absence of liquid water. If there is no water, the circuit formed by terminals 15*a*, 15*b* is open and the resistance is infinite. If water 16 is present (as in FIG. 4), the electric conduction between terminals 15*a*, 15*b* is detected. Thereby, according to the signals of presence sensor 15, the control element may decide to open or not valve 14. Thus, starting a draining at a time when the presence of water on condensation area 7 is certain limits the hydrogen loss. Further, due to presence sensor 15, the draining may be stopped as soon as the circuit formed by terminals 15*a*, 15*b* is open again. Presence sensor 15 can be adapted to all the described embodiments and variations.

Figure 5:
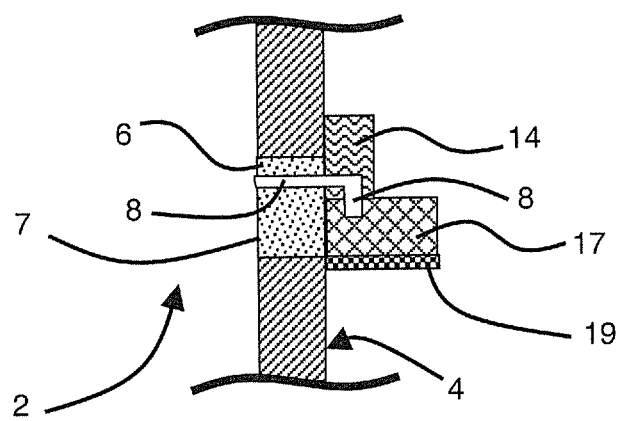
FIG. 5 illustrates a cross-section view centered on a condensation region equipped with a water storage and evaporation element.

In FIG. 5, generally applicable to all embodiments and their variations described hereabove, drain-off channel 8 may be connected to a liquid water storage and evaporation element 17 arranged outside of anode chamber 2 and fitted with drain-off channel 8, and preferably with valve 14, so as to absorb the water extracted from the inside of anode chamber 2. In the example of FIG. 5, drain-off channel 8 emerges into storage and evaporation element 17, which is fixed against the outer surface of wall 4 of anode chamber 2, preferably against condensation region 6. In other words, the storage and evaporation element is in contact with the insert in the first embodiment, and in contact with the wall on the outer surface at the level of the local thinning or of the protrusion, according to the second embodiment and its variation.

When storage and evaporation element 17 is at least partly impregnated with the water removed through drain-off channel 8, for example, thanks to valve 14, this water, in contact with the outside air to the anode chamber 2, evaporates, thus cooling down storage and evaporation element 17. Thus, storage and evaporation element 17, in contact with condensation region 6, and more specifically on the outer surface of wall 4, transmits by thermal transfer its temperature to the condensation area 7 inside of the anode chamber 2. Thus, the contact between condensation region 6 and element 17 is such that the thermal transfer between element 17 and region 6 is promoted. Storage and evaporation element 17 is preferably sufficiently porous to enable water to continuously evaporate. A pore size ranging between 1 μm and 1 mm is preferable to carry out the evaporation function. The total volume of pores is preferably sufficient to absorb all the water removed during a draining, it will thus be a function of the power of the fuel cell and of the back diffusion reaction. Storage and evaporation element 17 may have any shape, and may for example be a parallelepipedal foam promoting the evaporation of water. Storage and evaporation element 17 may be made of ceramic, of polymer, or preferably of metal to form a very good thermal conductor.

Experimentally, a storage and evaporation element 17 in the form of a nickel foam comprising 400-micron pores for a 1.6-mm foam thickness across a 1 cm$^2$ surface area has been formed. Water corresponding to the water generated by the operation of a 5-W fuel cell has been conveyed into the nickel foam. The temperature decrease at the nickel foam level has been of three degrees Celsius for a 22° C. ambient temperature at the foam level. Such a temperature difference is sufficient to create a cold point at condensation area 7, even if the temperature of anode chamber 2 is the same as the temperature outside of anode chamber 2. Thereby, it is preferable to arrange storage and evaporation element 17 against condensation region 6 outside of anode chamber 2, so that the temperature of storage and evaporation element 17 diffuses towards condensation area 7 to decrease the temperature thereof.

Thus, in the case where the temperature in anode chamber 2 is equal to the temperature outside of anode chamber 2, when the fuel cell is started, it will have an initialization phase where water drops will randomly form on the internal surface of anode chamber 2, and when a drop will form on condensation area 7, this drop will be removed in storage and evaporation element 17. As soon as the first drop has been removed, the water in storage and evaporation element 17 will cause, by the evaporation of the extracted condensed water, a decrease in the temperature of storage and evaporation element 17, as discussed hereabove. The temperature of storage and evaporation element 17, by its contact with condensation region 6, will lower the temperature of condensation area 7 in anode chamber 2. Then, water will only condense in condensation region 6 on condensation area 7 and the fuel cell will be in a state called permanent operating state.

Of course, to avoid the initialization phase, it is possible to pre-impregnate storage and evaporation element 17 before the starting of the fuel cell, or to place the fuel cell in an environment such that temperature $T_{int}$ inside of anode chamber 2 is strictly greater than temperature $T_{ext}$ outside of anode chamber 2.

Generally, and for all embodiments and their variations, a hydrophilic porous material 18 (FIG. 1) may be arranged in anode chamber 2 to avoid that drops formed on its internal surface other than on anode 10 to be detached in a shock and to fall on the anode, with the risk of filling catalytic sites and to thus decrease the efficiency of said fuel cell.

Indeed, the described fuel cell has the particularity, due to its surface 7 promoting condensation, of being used in all conditions and positions. Hydrophilic porous material 18 may take up all or part of the internal surface area of anode chamber 2, except for anode 10 and for membrane 9, and may be made of a polymer material, of cellulose, or of any other type of hydrophilic material. Advantageously, hydrophilic porous material 18 will be at least arranged on condensation area 7 to hold the water condensed at the level of said condensation area 7 until this water is removed through channel 8.

During the removal of the condensed water, even if the hydrogen loss is minimized as compared with prior art, this loss is not 100% avoided. Indeed, upon removal of the condensed water, hydrogen may come out of anode chamber 2, especially if the hydrogen in anode chamber 2 is at a pressure higher than the pressure of ambient air outside of the chamber (typically, the pressure in the anode chamber is strictly greater than 1 bar). Now, for ecological reasons, it is preferable to avoid rejecting hydrogen into the atmosphere. To answer environmental safety needs, storage and evaporation element 17 may comprise, as illustrated in FIG. 5, a material 19, for example, a metal, capable of performing a catalytic combustion of hydrogen.

However, since the combustion of hydrogen is an exothermic reaction, it is preferable to limit the thermal conductivity between material 19 capable of generating the combustion of hydrogen and the outer surface of the wall of anode chamber 2 at the level of condensation region 6. To achieve this, storage and evaporation element 17 may comprise two portions, a first portion in contact with the external surface of anode chamber 2 at the level of condensation region 6, and a second portion comprising material 19 capable of carrying out the combustion of hydrogen. Preferably, second portion 19 is distal, or remote, from said external surface of the chamber associated with condensation region 6. The first portion is preferably metallic (made of a metal which does not promote the combustion of hydrogen), and the second portion is preferably formed from a polymer covered with particles, for example, of platinum, palladium, nickel, or any other element allowing the combustion of hydrogen.

Figure 6:
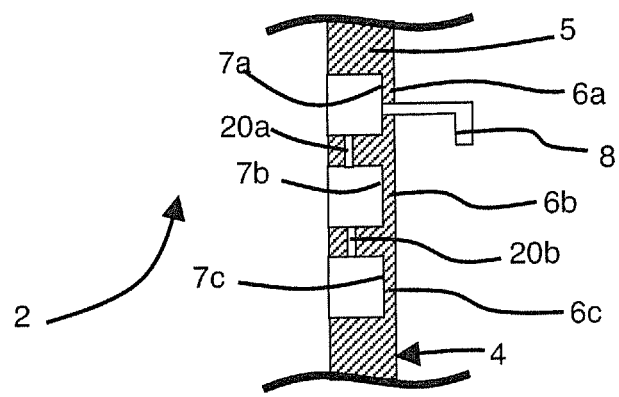
FIG. 6 illustrates an alternative embodiment of condensation regions.

In certain operating conditions of the fuel cell, the amount of water diffused back into anode chamber 2 may be greater than the amount that a single condensation region 6 is capable of managing. Thus, the wall may comprise, as illustrated in FIG. 6, several condensation regions 6a, 6b, 6c different from main region 5, where each region may comprise an associated condensation area 7a, 7b, 7c. Condensation regions 6a, 6b, 6c must respect the condition according to which their thermal conduction resistance between the outside and the inside of anode chamber 2 is strictly smaller than the thermal resistance of main region 5 of wall 4 to delimit water condensation areas 7a, 7b, 7c inside of anode chamber 2. Each condensation region 6a, 6b, 6c may be different, for example, of the type described in the first and second embodiments.

Each condensation area may comprise an associated channel and valve (not shown). However, to avoid an expensive multiplication of the number of valves, it is possible to envisage (FIG. 6) a network of condensation regions 6a, 6b, 6c coupled with at least one drain-off channel 8. In FIG. 6, drain-off channel 8 only connects condensation area 7a to the outside of anode chamber 2. Thus, a draining system may be provided between condensation regions 6a, 6b, 6c, for example, by connecting them with microchannels 20a, 20b formed, for example, in wall 4. In other words, wall 4 comprises condensation regions 6a, 6b, 6c interconnected by microchannels 20a, 20b, drain-off channel 8 connecting at least one condensation area 7 of one of the condensation regions outside of anode chamber 2.

Implementations with several condensation regions may be applied to all embodiments and variations of the above-described fuel cell. Such implementations may also be applied to planar cells and to stack cells.

A method for removing water formed in an anode chamber of a fuel cell may comprise the steps of:
  locally lowering the temperature of at least one condensation area of a wall of anode chamber 2 inside of anode chamber 2,
  condensing water vapor obtained by back diffusion during the fuel cell operation on condensation area 7,
  removing the water condensed on condensation area 7 through drain-off channel 8 connecting said condensation area 7 to the outside of anode chamber 2.

Further, before the removal step, a step of detecting the presence of condensed water on condensation area 7 may be carried out, the removal step being only carried out if condensed water is detected on condensation area 7.

Of course, this method can function with all embodiments of the fuel cell, the condensation area being formed by a portion of condensation region 6.

The invention claimed is:

1. A fuel cell comprising an anode chamber having a hydrogen inlet emerging into it,
wherein
  the fuel cell comprises a plurality of elementary cells delimited by pairs of electrodes, respectively forming an anode and a cathode, each pair being separated by an electrolyte membrane, the anodes being all arranged in the anode chamber,
  a wall having a first, inner face and a second, outer face opposite to the first, inner face, the wall separating an inside of the anode chamber from an outside of the anode chamber, the wall comprises:
  a main region extending from the first inner face to the second outer face, the main region having a first thermal conduction resistance measured between the first, inner face and the second, outer face of the wall,
  at least one region for promoting condensation of water extending from the first inner face to the second outer face, the least one region for promoting condensation of water having a second thermal conduction resistance measured between the first, inner face and the second, outer face of the wall strictly smaller than the first thermal conduction resistance so as to delimit a water condensation area within the anode chamber,
  a drain off channel for removing condensed water from the anode chamber, the drain off channel passing through the wall and is in direct contact with at least one of said regions for promoting condensation of water, the drain off channel being distinct from the main region,
  the fuel cell comprises a liquid water storage and evaporation element arranged outside of the anode chamber and fitted with the drain-off channel so as to absorb the water extracted from said anode chamber,
  wherein the main region is configured to block transfer of water between the first inner face and the second outer face,
  wherein the at least one region for promoting condensation of water is configured to block transfer of water between the first inner face and the second outer face,
  wherein the storage and evaporation element is at least partially covering the second outer face of the at least one of said regions for promoting the condensation of water, and
  wherein the storage and evaporation element comprises a porous material configured to store and evaporate water concurrently and continuously.

2. The fuel cell according to claim 1, wherein at least two of the plurality of elementary cells comprise a common electrolyte membrane.

3. The fuel cell according to claim 1, wherein the fuel cell comprises a plurality of individual electrolyte membranes each corresponding to an elementary cell.

4. The fuel cell according to claim 1, wherein the at least one region for promoting the condensation of water is formed by a local thinning of the wall in the anode chamber.

5. The fuel cell according to claim 1, wherein at least one of said at least one region for promoting the condensation of water comprises an insert filling a hole in the wall having the inside of the anode chamber communicate with the outside of the anode chamber.

6. The fuel cell according to claim 5, wherein the insert is made of a material having a greater thermal conductivity than a material used to delimit the main region.

7. The fuel cell according to claim 1, wherein the drain-off channel is connected to a valve controlling removal of the condensed water through said drain-off channel.

8. The fuel cell according to claim 7, wherein at least one of said at least one region for promoting the condensation of water is fitted with a sensor configured to detect presence of water, the sensor being connected to the valve so as to start removal of water when the sensor detects water on at least one of said at least one region for promoting the condensation of water.

9. The fuel cell according to claim 1, wherein the storage and evaporation element comprises a material configured to carry out a catalytic combustion of hydrogen.

10. The fuel cell according to claim 1, wherein a hydrophilic, porous material is arranged in the anode chamber.

11. The fuel cell according to claim 1, wherein said at least one region for promoting condensation of water comprises a plurality of distinct regions interconnected by microchannels, the drain-off channel connecting at least one of the plurality of distinct regions for promoting condensation of water.

12. The fuel cell according to claim 1, wherein the porous material has a pore size ranging between 1 µm and 1 mm.

13. The fuel cell according to claim 1, wherein the storage and evaporation element is in direct contact with at least one of said at least one region for promoting condensation of water.

14. The fuel cell according to claim 1, wherein a hydrophilic material is disposed on the first, inner face of the wall.

15. The fuel cell according to claim 14, wherein the hydrophilic material is disposed so as to cover at least one of said at least one region for promoting the condensation of water.

16. The fuel cell according to claim 1, wherein the drain off channel is surrounded by at least one of said at least one region for promoting condensation of water.

17. The fuel cell according to claim 1, wherein said main region and said at least one region for promoting condensation are formed in the same plane face of said wall.

18. The fuel cell according to claim 1, wherein the anode chamber comprises a first face formed by the electrolyte membrane, remaining faces of the anode chamber are formed by a cover and wherein the hydrogen inlet is separated from the drain off channel by the anodes of the plurality of elementary cells.

19. The fuel cell according to claim 1, wherein the second, outer face of the wall is a planar face.

20. The fuel cell according to claim 1, wherein the storage and evaporation element is arranged to cool at least one of said at least one region for promoting condensation of water by said evaporation of water.

21. A method for condensing and removing water formed in an anode chamber of a fuel cell according to claim 1, wherein said method comprises the steps of:

locally lowering a temperature of the water condensation area of the wall of the anode chamber inside of the anode chamber, condensing water vapor obtained by back diffusion during operation of the fuel cell on the water condensation area, removing the condensed water on the water condensation area through a drain-off channel connecting said water condensation area to the outside of the anode chamber.

22. The method according to claim 21, wherein before the step of removing, a step of detecting presence of the condensed water on the water condensation area is carried out, the step of removing being only carried out if the condensed water is detected on the water condensation area.

* * * * *